United States Patent
Madukkarumukumana et al.

(10) Patent No.: US 7,222,203 B2
(45) Date of Patent: May 22, 2007

(54) INTERRUPT REDIRECTION FOR VIRTUAL PARTITIONING

(75) Inventors: Rajesh S. Madukkarumukumana, Portland, OR (US); Ioannis Schoinas, Portland, OR (US); Gilbert Neiger, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 116 days.

(21) Appl. No.: 10/731,171

(22) Filed: Dec. 8, 2003

(65) Prior Publication Data

US 2005/0125580 A1  Jun. 9, 2005

(51) Int. Cl.
G06F 13/24 (2006.01)
G06F 12/00 (2006.01)

(52) U.S. Cl. .................. 710/260; 710/269; 710/48; 718/100; 718/1; 711/151

(58) Field of Classification Search ........ 710/260–269; 711/6
See application file for complete search history.

(56) References Cited

U.S. PATENT DOCUMENTS

| | | | | |
|---|---|---|---|---|
| 5,101,346 A | * | 3/1992 | Ohtsuki | 718/100 |
| 5,291,605 A | * | 3/1994 | Takagi et al. | 710/48 |
| 5,361,375 A | * | 11/1994 | Ogi | 718/1 |
| 5,371,857 A | * | 12/1994 | Takagi | 710/260 |
| 5,553,291 A | * | 9/1996 | Tanaka et al. | 718/1 |
| 5,560,019 A | * | 9/1996 | Narad | 710/260 |
| 5,892,956 A | * | 4/1999 | Qureshi et al. | 710/260 |
| 6,397,242 B1 | * | 5/2002 | Devine et al. | 718/1 |
| 6,453,344 B1 | * | 9/2002 | Ellsworth et al. | 709/220 |
| 6,453,392 B1 | * | 9/2002 | Flynn, Jr. | 711/151 |
| 6,944,699 B1 | * | 9/2005 | Bugnion et al. | 710/269 |
| 7,020,761 B2 | * | 3/2006 | Siegel et al. | 711/202 |
| 2004/0003323 A1 | | 1/2004 | Bennett | |
| 2004/0010788 A1 | | 1/2004 | Cota-Robles | |
| 2004/0117532 A1 | | 6/2004 | Bennett | |
| 2004/0215860 A1 | * | 10/2004 | Armstrong et al. | 710/260 |
| 2005/0060703 A1 | | 3/2005 | Smith, III | |
| 2005/0071840 A1 | | 3/2005 | Smith, III | |
| 2005/0132365 A1 | | 6/2005 | Madukkarumukumana | |

OTHER PUBLICATIONS

Pending, not yet published, U.S. Appl. No. 10/956,198, filed Sep. 30, 2004, Neiger.
Pending, not yet published, U.S. Appl. No. 11/191,827, filed Jul. 27, 2005, Bennett.
Pending, not yet published, U.S. Appl. No. 11/323,374, filed Dec. 30, 2005, Bennett.

* cited by examiner

*Primary Examiner*—Paul R. Myers
*Assistant Examiner*—Brian Misiura
(74) *Attorney, Agent, or Firm*—Thomas R. Lane

(57) ABSTRACT

The present disclosure relates to the handling of interrupts in a environment that utilizes virtual machines, and, more specifically, to the steering of interrupts between multiple logical processors running virtual machines.

28 Claims, 2 Drawing Sheets

INTERRUPT REDIRECTION FOR VIRTUAL PARTITIONING

BACKGROUND

1. Field

The present disclosure relates to the handling of interrupts in a environment that utilizes virtual machines, and, more specifically, to the steering of interrupts between multiple logical processors running virtual machines.

2. Background Information

The virtualization of machine resources has been of significant interest for some time; however, with processors becoming more diverse and complex, such as processors that are deeply pipelined/super pipelined, hyperthreaded, and processors having Explicitly Parallel Instruction Computing (EPIC) architecture, and with larger instruction and data caches, virtualization of machine resources is becoming an even greater interest.

Many attempts have been made to make virtualization more efficient. For example, some vendors offer software products that have a virtual machine system that permits a machine to be partitioned, such that the underlying hardware of the machine appears as one or more independently operating virtual machines (VM). Typically, a Virtual Machine Monitor (VMM) may be a thin layer of software running on a computer and presenting to other software an abstraction of one or more VMs. Each VM, on the other hand, may function as a self-contained platform, running its own operating system (OS), or a copy of the OS, and/or a software application. Software executing within a VM is collectively referred to as "guest software". Some commercial solutions that provide software VMs include VMware, Inc. (VMware) of Palo Alto, Calif. and VirtualPC by Microsoft Corp. of Redmond, Wash.

A VM may typically see and interact with a set of virtual resources. The VMM is typically responsible for emulating these virtual devices and mapping the virtual devices to the physical devices. The virtual device emulation is typically used to allow a plurality of virtual machines to share the physical devices in simultaneous or time-multiplexed fashion. For performance or reasons otherwise, a VMM may assign or partition certain physical devices for exclusive use by a specific virtual machine. A typical VMM, which may be considered the host of the VMs, may also enhance performance of a VM by permitting direct access to parts of the underlying physical machine in some situations.

In this context, an interrupt is a request for attention from the processor. Typically, when the processor receives an interrupt, it suspends its current operations, saves the status of its work, and transfers control to a special routine known as an interrupt handler, which contains the instructions for dealing with the particular situation that caused the interrupt. Interrupts can be generated by, for example, various hardware devices to request service or report problems, or by the processor itself in response to program errors or requests for operating-system services. Interrupts are often the processor's way of communicating with the other elements that make up a computer system.

External hardware interrupts are interrupts generated by devices in the system and may be used for such situations, such as, for example, a character received from a keyboard and needing to be processed, a disk drive ready to transfer a block of data, or a tick of the system timer. Internal hardware interrupts may occur when a program attempts an impossible action, such as, for example, accessing an unavailable address or dividing by zero.

Generally, interrupts are assigned levels of importance or priority. The highest priority is given to a type of interrupt called a non-maskable interrupt-one that indicates a serious error, such as a system failure, that must be serviced immediately. The hierarchy of interrupt priorities often determines which interrupt request will be handled first if more than one request is made. A program can temporarily disable some interrupts if it needs the full attention of the processor to complete a particular task.

Typical interrupt generation and processing in computer platforms involve some type of interrupt controller. Currently, typical computer platform interrupt architecture utilizes an Advanced Programmable Interrupt Controller (APIC) that includes two parts, a local part, which is "local" to the processor(s), and an input/output (IO) part, that is typically part of the computer's I/O subsystem. The APIC architecture is capable of directing interrupts to a specific processor based on logical or physical processor-ID, or automatically redirecting interrupts to the processor currently executing the lowest priority task. However, the current APIC solution assumes that the same operating system software is managing and executing on all the processors in the system. In this context, "processors" refers to all logical processors, be they, for example, multi-processors, multi-core processor, or hyper-threaded processors. In the case where multiple VMs are being executed substantially simultaneously on different processors, the processor that is associated with the lowest priority may not be running the VM that owns the partitioned interrupting device.

Typically, if the interrupt from an assigned device is delivered to a processor that is not running the target VM, the interrupt causes the VMM to trap the interrupt. The VMM is then required to steer the interrupt to the target VM by appropriate means. One example technique is for the VMM software to re-direct the interrupt to the processor running the target VM through an inter-processor interrupt (IPI). This software based interrupt steering often causes reduction in performance. Often, even if the interrupt is delivered by hardware to the correct processor (running the target VM), the VMM still traps the interrupt because the VMM traps every interrupt in order to assure that the interrupt is properly directed to the processor. This is required since existing interrupt steering in hardware has no notion of virtual machine locality with respect to the processors in the system.

BRIEF DESCRIPTION OF THE DRAWINGS

Subject matter is particularly pointed out and distinctly claimed in the concluding portions of the specification. The disclosed subject matter, however, both as to organization and the method of operation, together with objects, features and advantages thereof, may be best understood by a reference to the following detailed description when read with the accompanying drawings in which:

DETAILED DESCRIPTION

In the following detailed description, numerous details are set forth in order to provide a thorough understanding of the present disclosed subject matter. However, it will be understood by those skilled in the art that the disclosed subject matter may be practiced without these specific details. In other instances, well-known methods, procedures, components, and circuits have not been described in detail so as to not obscure the disclosed subject matter.

Figure 1:
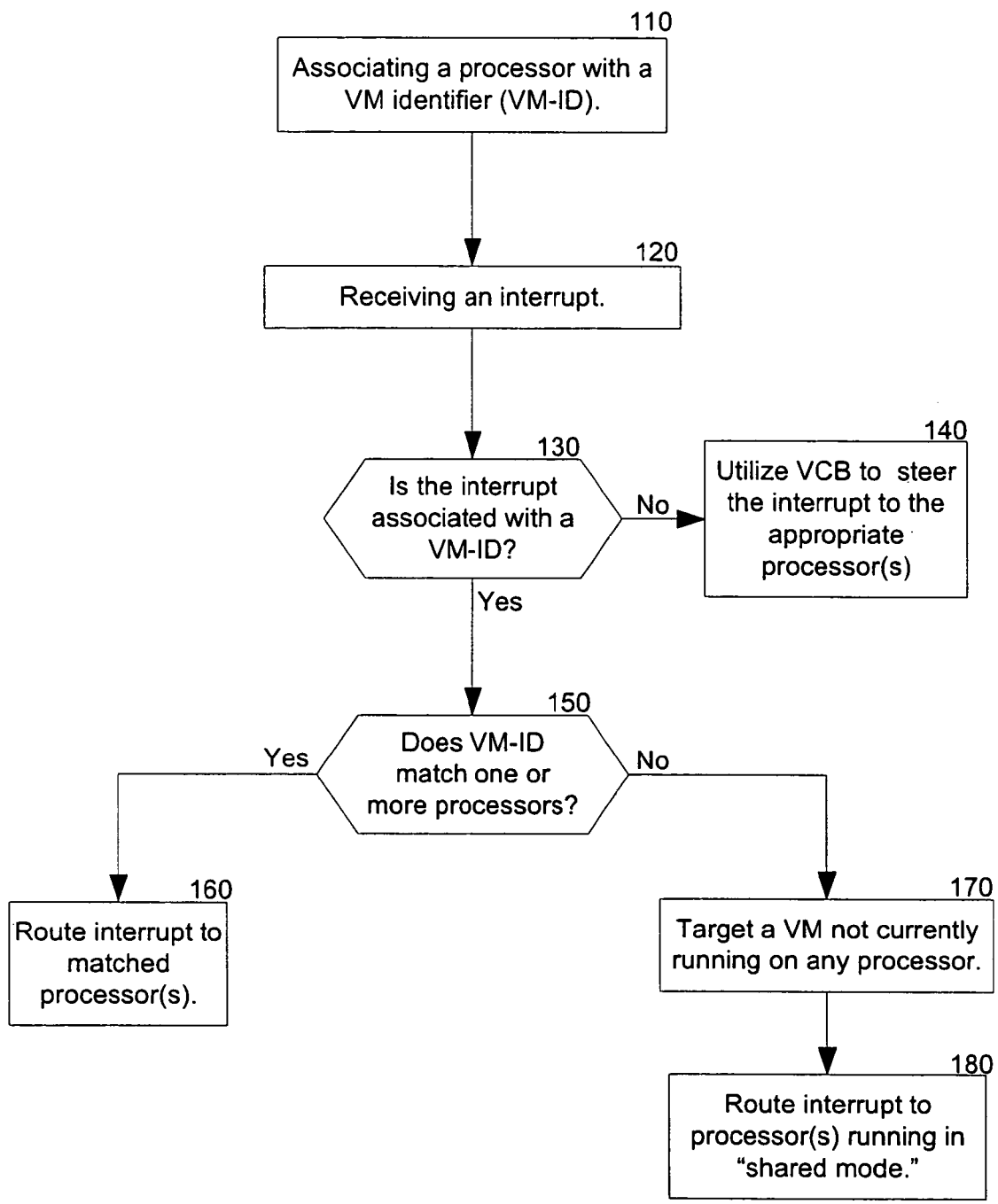
FIG. 1 is a flowchart illustrating an embodiment of a technique for steering interrupts between multiple logical processors running virtual machines in accordance with the disclosed subject matter.

FIG. 1 is a flowchart illustrating an embodiment of a technique for steering interrupts between multiple logical processors running virtual machines in accordance with the disclosed subject matter. Block 110 illustrates that a processor may be associated with a particular VM utilizing a VM identifier (VM-ID). In one embodiment, each VM may be assigned a unique identifier by a Virtual Control Block (VCB). In one embodiment, the VCB may be a virtual machine monitor (VMM), as described above. In another embodiment, the VCB may be a host operating system virtualization driver. In yet another embodiment, the VCB may be a processor hardware abstraction, such as, for example, Intel Itanium architecture where some parts of the VCB are in the Processor Abstraction Layer (PAL) microcode. In one embodiment, the VCB may be referred to as a Virtual Control Program (VCP). It is understood that the VCB may be implemented in hardware, firmware, software or a combination thereof.

It is contemplated that the VCB may communicate the VM-ID to the executing processor. In one embodiment, the VCB may save the VM-ID of the VM in a virtual machine control block which may be loaded by the processor when initiating or resuming the VM execution. Each processor may then know the VM-ID of the VM it is currently executing.

If a particular processor is reserved to run a specific VM (for example, a preferred VM), the processor is considered to be running in "dedicated mode." Conversely, if multiple VMs can be run on a particular processor, for example if multiple VMs are time sharing the execution time of the processor, the processor is considered to be running in "shared mode." A typical VCB may, in one example embodiment, run a specific VM in dedicated mode if the VM has specific performance or real-time requirements that may not be fulfilled by running it in shared mode. In one embodiment, one or more processors operating in dedicated mode may be associated with a particular VM, and the system (hardware/software) may utilize the dedicated usage mode to provide specialized features such as for improved performance. In another embodiment, a VCB may run VMs in shared mode on one or more processors to get better utilization of the processing resources. In one embodiment, a processor operating in shared mode may be associated with multiple VMs over a period of time, as the processor gets shared between these VMs.

In one embodiment, whenever a VM is started (or resumed) on a processor, the processor may associate the VM with the processor through its unique VM-ID. In one particular embodiment, the processor or some logical extension of it may send out the new VM-ID of the VM it is currently executing via, for example, a processor bus transaction or a packet, to a plurality of connected host bridges or IO hubs (hereafter, "IO hubs"). In one embodiment, the manner of the processor communicating the currently associated VM-ID with the IO hub may be similar to the known techniques for communicating the processor's execution task priority updates. In certain embodiments, the task priority of a program as set by the software running in a VM may be normalized by the processor using the relative priority of the VM (as specified by the VCB) before reporting it to other parts of the system such as host bridges or IO hubs.

In one embodiment, a participant table or equivalent structure in the IO hub may be used to associate the processors with the processor's currently executing VMs. In other embodiments, the host bridges or IO hubs may utilize the information about the currently executing VM on a processor to optimize other system parameters or resources.

In one embodiment, a particular interrupt generating device may be exclusively controlled by a particular VM. Examples of interrupt generating devices may include, for example, a network interface, a hard drive, an input device, or a graphical display card; however, these are merely a few non-limiting examples of an interrupt generating device. In another embodiment, rather than individual devices, a portion of the physical machine's IO-subsystem (and thereby all devices in this portion of the subsystem), for example an entire PCI-Express root port hierarchy, may be assigned and exclusively controlled by a particular VM.

The IO hub may provide facilities to associate assigned resources in the IO-subsystem with its respective VMs through VM-IDs. In one embodiment, for line-based interrupts, the VCB may encode through the APIC (or equivalent interrupt controller) portion of the IO hub, the VM-ID associated with an assigned device's interrupt request in the corresponding entry of the controller's interrupt redirection table (or equivalent structure). In another embodiment, for message-based interrupts that do not require routing through the IO portion of interrupt controllers, the VCB may encode the associated VM-ID directly in the assigned device, such as, for example, through the device's message signaled interrupt (MSI) registers.

For shared devices, the VM-ID may be a well-known value, such as zero, that indicates that the device is shared among multiple VMs and the otherwise VM locality based interrupt steering is not desired. In another embodiment, since interrupt events from shared devices are typically processed by a centralized software entity (such as the VCB or a special service VM), these interrupts may be also steered to specific processor targets based on the configuration and characteristics of this software entity. Of course, other embodiments that allow software to associate with or derive specific VM identifiers for device transactions are within the scope of the disclosed subject matter. In one embodiment, the encoding of a request for VM locality based interrupt steering and the target VM-ID may be substantially similar to the known techniques for encoding other information (such as interrupt type, vector number, delivery mode etc.) in interrupt messages.

Block 120 illustrates that an interrupt may be received by the entity responsible for interrupt steering. Block 130 illustrates that the interrupt may be checked to determine if it specifies (directly or indirectly) to steer interrupts based on VM locality information and if it contains or is associated with a particular VM-ID. In one embodiment, the interrupt generating device may encode the VM-ID as part of the interrupt message. In another embodiment, the IO hub may associate any interrupts generated by a particular device (or set of devices in an assigned portion of the IO-subsystem) as being associated with a particular VM-ID.

Block 140 illustrates that, in one embodiment, if the interrupt is not associated with or specify VM locality based interrupt steering, the interrupt may be delivered according to normal steering policies in the system and, in one embodiment, the VCB may be utilized as appropriate to indirectly steer the interrupt to the appropriate processor. In one embodiment, the VCB may trap these interrupts, determine the appropriate target processor, and dispatch the interrupt to the target through an inter-processor interrupt (IPI) facility or process the interrupt event on the local processor. Of course, other embodiments, and techniques are within the scope of the disclosed subject matter.

Block 150 illustrates that, if the interrupt specifies steering based on VM locality and is associated with a VM-ID, it may be determined if the VM-ID is currently associated with one or more processors, which in-turn indicates the target VM's processor locality. In one embodiment, the VM-ID may be associated with multiple processors if that VM is simultaneously running on multiple processors, for example on a SMP operating system. In one embodiment, the association may be determined by looking up the VM-ID in a participant table or equivalent structure that correlates processors with their currently executing VMs.

Block 160 illustrates that, if the VM-ID of the interrupt is associated with one or more processors, the interrupt may be steered to those processors. In one embodiment, where the target VM is determined to be currently running on exactly one logical processor, the interrupt may be forwarded substantially intact to this processor. In another embodiment, the interrupt may be reformatted or otherwise altered, such as, for example, the interrupt's vector or priority may be altered, before being steered to the processor. In one embodiment, where multiple processors are associated with the target VM-ID, the interrupt may be forwarded to the processor that has reported as currently executing the lowest priority task among these associated processors and hence identified as most suitable for receiving external interrupt events.

In another embodiment, the participant table may allow a single processor to be simultaneously associated with multiple VM-IDs and where a processor, running in shared mode, is associated with the VM-ID, but is not currently running the VM, the dormant VM may be resumed by the processor and the interrupt delivered. Alternatively, in another embodiment, the interrupt may be trapped by the VCB but extra information, regarding at least in part the associated processor, may be passed to the VCB in order to facilitate efficient handling of the interrupt.

Block 170 illustrates that, if the VM-ID of the interrupt is not currently associated with any processors, a VM not currently running on any processor is targeted by the interrupt. In one embodiment the interrupt may be destined for a target VM that has currently been placed in a dormant state by the VCB as part of time-multiplexing the underlying processor resources. Block 180 illustrates that the interrupt may be steered to one of the processors, currently running in shared mode and executing at the lowest task priority. In one embodiment, the interrupt may be trapped by the VCB in order to facilitate efficient handling of the interrupt, by first resuming the dormant target VM on the processor and synthesizing and delivering a virtual interrupt event to it through appropriate virtualization mechanisms. However, other techniques for delivering the interrupt are within the scope of the disclosed subject matter.

Figure 2:
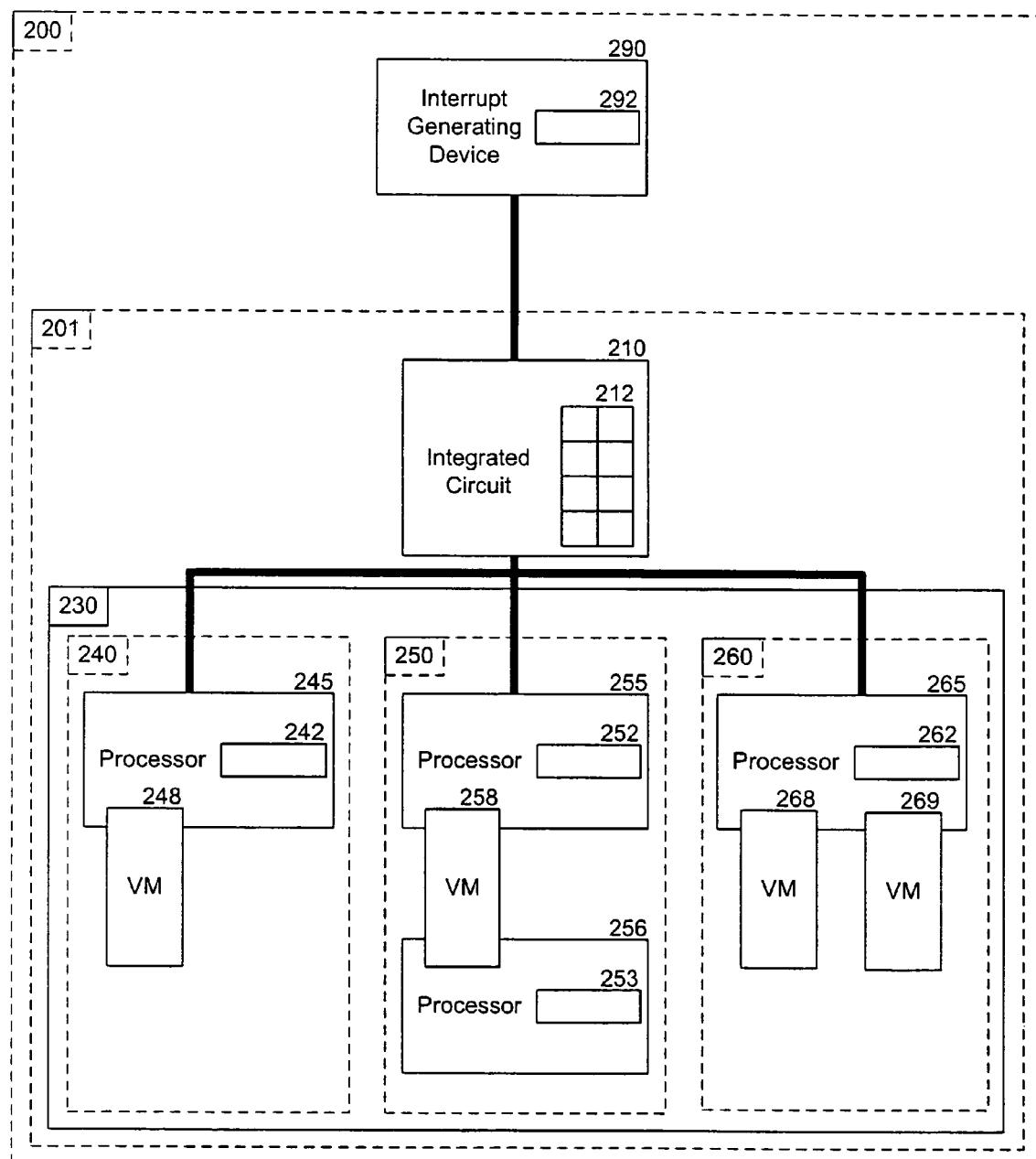
FIG. 2 is a block diagram illustrating an embodiment of a system and an apparatus that allows for steering interrupts between multiple logical processors running virtual machines in accordance with the disclosed subject matter.

FIG. 2 is a block diagram illustrating an embodiment of a system 200 and an apparatus 201 that allows for steering interrupts between multiple logical processors running virtual machines in accordance with the disclosed subject matter. In one embodiment the apparatus may include a plurality of processors 230, and an integrated circuit 210 to steer and redirect interrupts from the interrupt generating device 290 and the plurality of processors.

The integrated circuit 210 may include a participant table 212 to associate currently executing VMs with processors, possibly utilizing a VM-ID. In one embodiment, the integrated circuit may be an IO hub or a host bridge. In one embodiment, the integrated circuit may receive interrupts from the interrupt generating device 290. In one embodiment, the interrupt generating device may include a memory element 292 that associates some or all interrupts from the device with a particular VM, possibly utilizing a VM-ID. The integrated circuit may steer the received interrupts to the appropriate processors utilizing a technique substantially similar the technique described above and illustrated by FIG. 1.

The plurality of processors 230 may be capable of running a plurality of VMs. The each processor may also be capable of associating itself with a particular VM that is currently being executed by the processor. It is important to note that the plurality of processor may only be a plurality of logical, not physical processors. In one embodiment, the processors may include a hyper-threaded processor, a multi-cored processor, several physical processors, or a mixture thereof. FIG. 2 illustrates three processors and situations; however, the disclosed subject matter is not limited to any number of processors or VM configurations.

Block 245 illustrates a processor 245 executing a VM 248 in dedicated mode. The processor 245 may include a memory element 242 to store the VM-ID of VM 248. Block 250 illustrates multiple processors 255 & 256 executing a single multi-processing capable VM 258. Both of the processors 255 & 256 may include memory elements 252 & 253 to store the VM-ID of VM 258. In this example, the two processors may store the same VM-ID and operation (shared or dedicated) mode. Block 260 illustrates a single processor 265 running in shared mode. The single processor 265 is responsible for executing two VMs, 268 & 269. However, the single processor 265 may be only capable of executing a single VM at a time, and, therefore, may time-slice between the two VMs. The processor may include a memory element 262 to denote the VM-ID of the particular VM that is currently being executed. In certain embodiments, the information stored and communicated across the system components associating to a VM may not be limited to VM identifiers, but could also include other operational or functional information that is relevant when executing the specified VM.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, network or communication processors, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact disk read only memory (CD-ROM), digital versatile disk (DVD), hard disk, firmware, non-volatile memory, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the disclosed subject matter have been illustrated and described herein, many modifications, substitutions, changes, and equivalents will now occur to those skilled in the art. It is, therefore, to be understood that the appended claims are intended to cover all such modifications and changes that fall within the true spirit of the disclosed subject matter.

What is claimed is:

1. A method comprising:
    associating a virtual machine with a processor utilizing a virtual machine identifier;
    receiving an interrupt;
    determining if the interrupt is associated with a virtual machine identifier that is associated with one or more processors; and
    if so, routing the interrupt to the matching processor(s); and
wherein if the interrupt is associated with a virtual machine identifier that is currently not associated with one or more processors,
    targeting a virtual machine not currently running on any processor; and
    routing the interrupt to a processor running in shared mode and reported as executing the lowest priority task.

2. The method of claim 1, wherein associating a virtual machine with a processor utilizing a virtual machine identifier includes:
    receiving a communication from the processor that includes a virtual machine identifier; and
    storing a processor identifier and the virtual machine identifier in a participant table.

3. The method of claim 2, wherein receiving a communication from the processor includes utilizing, at least in part, the VM-ID information to optimize system resources and parameters.

4. The method of claim 2, wherein receiving a communication from the processor that includes a virtual machine identifier occurs when the processor either initiates or resumes execution of a virtual machine indicated by the virtual machine identifier.

5. The method of claim 4, wherein a virtual control block (VCB)
    specifies a virtual machine identifier for each virtual machine, and
    stores the virtual machine identifier in an executing processor utilizing a virtual machine control block.

6. The method of claim 2, wherein associating a virtual machine with a processor utilizing a virtual machine identifier includes:
    receiving a communication from the processor that includes information that denotes whether or not the processor is running in shared or dedicated mode; and
    storing the processor mode information in a participant table.

7. A method comprising:
    associating a virtual machine with a processor utilizing a virtual machine identifier;
    receiving an interrupt;
    determining if the interrupt is associated with a virtual machine identifier that is associated with one or more processors;
    if so, routing the interrupt to the matching processor(s); and
    associating an interrupt generating device that is exclusively assigned to a virtual machine with the virtual machine's identifier.

8. The method of claim 7, wherein associating an interrupt generating device includes storing the virtual machine identifier in a memory element within the device so that any interrupts generated by the device may include the virtual machine identifier.

9. The method of claim 7, wherein associating an interrupt generating device includes:
    utilizing an interrupt controller, having interrupt input lines, to route all interrupts from the interrupt generating device, and
    associating a virtual machine identifier with an input line of the interrupt controller; and
wherein the interrupt controller assumes that all interrupts incoming on the associated interrupt input line are associated with the virtual machine identifier.

10. An article comprising:
    a machine accessible storage medium having a plurality of machine accessible instructions, wherein when the instructions are executed, the instructions provide for:
        associating a virtual machine with a processor utilizing a virtual machine identifier;
        receiving an interrupt;
        determining if the interrupt is associated with a virtual machine identifier that is associated with one or more processors; and
        if so, routing the interrupt to the matching processor(s); and
    wherein, if the interrupt is not associated with a virtual machine identifier tat is currently associated with one or more processors,
        targeting a virtual machine not currently running on any processor; and
        routing the interrupt to a processor running in shared mode and reported as executing the lowest priority task.

11. The Article of claim 10, wherein the instructions providing for associating a virtual machine with a processor utilizing a virtual machine identifier includes instructions providing for:
    receiving a communication from the processor that includes a virtual machine identifier; and
    storing a processor identifier and the virtual machine identifier in a participant table.

12. The article of claim 11, wherein the instructions providing for receiving a communication from the processor includes instructions providing for utilizing, at least in part, the VM-ID information to optimize system resources and parameters.

13. The article of claim 11, wherein the instructions providing for receiving a communication from the processor that includes a virtual machine identifier occurs when the processor either initiates or resumes execution of a virtual machine indicated by the virtual machine identifier.

14. The article of claim 13, further including instructions providing for a virtual control block (VCB)
   specifying a virtual machine identifier for each virtual machine, and
   storing the virtual machine identifier in an executing processor utilizing a virtual machine control block.

15. The article of claim 11, wherein the instructions providing for associating a virtual machine with a processor utilizing a virtual machine identifier includes instructions providing for:
   receiving a communication from the processor that includes information that denotes whether or not the processor is running in shared or dedicated mode; and
   storing the processor mode information in a participant table.

16. An article comprising:
   a machine accessible storage medium having a plurality of machine accessible instructions, wherein when the instructions are executed, the instructions provide for:
   associating a virtual machine with a processor utilizing a virtual machine identifier;
   receiving an interrupt;
   determining if the interrupt is associated with a virtual machine identifier that is associated with one or more processors;
   if so, routing the interrupt to the matching processor(s); and
   associating an interrupt generating device that is exclusively assigned to a virtual machine with the virtual machine's identifier.

17. The article of claim 16, wherein the instructions providing for associating an interrupt generating device includes instructions providing for storing the virtual machine identifier in a memory element within the device so that any interrupts generated by the device may include the virtual machine identifier.

18. The article of claim 16, wherein the instructions providing for associating an interrupt generating device includes instructions providing for:
   utilizing an interrupt controller, having interrupt input lines, to route all interrupts from the interrupt generating device, and
   associating a virtual machine identifier with an input line of the interrupt controller; and
wherein the interrupt controller assumes that all interrupts incoming on the associated interrupt input line are associated with the virtual machine identifier.

19. An apparatus comprising:
   a plurality of processors:
      to execute a plurality of virtual machines having virtual machine identifiers, and
      wherein each processor is capable of communicating, to an integrated circuit, the virtual machine identifier of the virtual machine that the processor is currently executing; and
   the integrated circuit to steer interrupts to the processor utilizing, at least in part, the virtual machine interrupts; and
wherein the integrated circuit is capable of:
   associating each processor with a virtual machine identifier, and the associations are stored in a participant table, and
   determining whether each processor is running in shared or dedicated mode.

20. An apparatus comprising:
   a plurality of processors to execute a plurality of virtual machines having virtual machine identifiers; and
   an integrated circuit to steer interrupts to the processor utilizing, at least in part, the virtual machine interrupts; end
wherein the integrated circuit is capable of:
   utilizing, at least in part, the VM-ID information to optimize system resources and parameters;
   receiving an interrupt;
   determining if the interrupt is associated with a virtual machine identifier that is associated with one or more processors; and
   if so, routing the interrupt to the matching processor(s).

21. An apparatus comprising:
   a plurality of processors to execute a plurality of virtual machines having virtual machine identifiers;
   an integrated circuit to steer interrupts to the processor utilizing, at least in part, the virtual machine interrupts;
   a virtual control block (VCB) that is capable of:
      specifying a virtual machine identifier for each virtual machine, and
      storing the virtual machine identifier in an executing processor utilizing a virtual machine control block; and
wherein the integrated circuit is further capable of:
   if the interrupt is not associated with a virtual machine identifier,
      utilizing a virtual control block to steer the interrupt to the appropriate processor.

22. An apparatus comprising:
   a plurality of processors to execute a plurality of virtual machines having virtual machine identifiers;
   an integrated circuit to steer interrupts to the processor utilizing, at least in part, the virtual machine interrupts; and
wherein the integrated circuit is capable of:
   if the interrupt is not associated with a virtual machine identifier,
      utilizing a virtual control block to steer the interrupt to the appropriate processor; and
   if the interrupt is associated with a virtual machine identifier that is not currently associated wit one or more processors,
      targeting a virtual machine not currently running on any processor; and
      routing the interrupt to a processor running in shared mode and reported as executing the lowest priority task.

23. An apparatus comprising:
   a plurality of processors to execute a plurality of virtual machines having virtual machine identifiers;
   an integrated circuit to steer interrupts to the processor utilizing, at least in part, the virtual machine interrupts; and
wherein each processor is capable of:
   communicating, to the integrated circuit, the virtual machine identifier of the virtual machine that the processor is currently executing when the processor either initiates or resumes execution of the virtual machine.

24. An apparatus comprising:
   a plurality of processors to execute a plurality of virtual machines having virtual machine identifiers;
   an integrated circuit to steer interrupts to the processor utilizing, at least in part, the virtual machine interrupts; and wherein each processor is capable of:
  communicating, to the integrated circuit, the virtual machine identifier of the virtual machine that the processor is currently executing; and
wherein the integrated circuit is capable of associating an interrupt generating device by:
  utilizing an interrupt controller, having interrupt input lines, to route all interrupts from the interrupt generating device, and
  associating a virtual machine identifier with an input line of the interrupt controller; and
wherein the interrupt controller assumes that all interrupts incoming on the associated interrupt input line are associated with the virtual machine identifier.

25. A system comprising:
  a plurality of processors to execute a plurality of virtual machines having virtual machine identifiers;
  at least one interrupt generating device to transmit an interrupt having a virtual machine identifier; and
  an integrated circuit to steer interrupts to the processor utilizing, at least in part, the virtual machine interrupts; and
wherein the integrated circuit is capable of:
  utilizing, at least in part, the VM-ID information to optimize system resources and parameters;
  receiving an interrupt;
  determining if the interrupt is associated with a virtual machine identifier that is associated with one or more processors; and
  if so, routing the interrupt to the watching processor(s).

26. A system comprising:
  a plurality of processors to execute a plurality of virtual machines having virtual machine identifiers;
  at least one interrupt generating device to transmit an interrupt having a virtual machine identifier;
  an integrated circuit to steer interrupts to the processor utilizing, at least in part, the virtual machine interrupts; and
  a virtual control block (VCB) that is capable of:
    specifying a virtual machine identifier for each virtual machine, and
    storing the virtual machine identifier in an executing processor utilizing a virtual machine control block; and
wherein the integrated circuit is capable of:
  receiving an interrupt;
  determining if the interrupt is associated with a virtual machine identifier that is associated with one or more processors;
  if so, routing the interrupt to the matching processor(s); and
  if the interrupt is not associated with a virtual machine identifier, utilizing a virtual control block to steer the interrupt to the appropriate processor.

27. A system comprising:
  a plurality of processors to execute a plurality of virtual machines having virtual machine identifiers;
  at least one interrupt generating device to transmit an interrupt having a virtual machine identifier;
  an integrated circuit to steer interrupts to the processor utilizing, at least in part, the virtual machine interrupts; and
wherein the integrated circuit is capable of:
  if the interrupt is not associated with a virtual machine identifier,
    utilizing a virtual control block to steer the interrupt to the appropriate processor;
  if the interrupt is associated with a virtual machine identifier that is not currently associated with one or more processors,
    targeting a virtual machine not currently running on any processor; and
    routing the interrupt to a processor running in shared mode reported as executing the lowest priority task.

28. A system comprising:
  a plurality of processors to execute a plurality of virtual machines having virtual machine identifiers;
  at least one interrupt generating device to transmit an interrupt baying a virtual machine identifier; and
  an integrated circuit to steer interrupts to the processor utilizing, at least in part, the virtual machine interrupts;
wherein each processor is capable of:
  communicating, to the integrated circuit, the virtual machine identifier of the virtual machine that the processor is currently executing; and
wherein the integrated circuit is capable of associating an interrupt generating device by:
  utilizing an interrupt controller, having interrupt input lines, to route all interrupts from the interrupt generating device, and
  associating a virtual machine identifier with an input line of the interrupt controller; and
wherein the interrupt controller assumes that all interrupts incoming on the associated interrupt input line are associated with the virtual machine identifier.

* * * * *